Patented Jan. 18, 1938

2,105,862

UNITED STATES PATENT OFFICE 2,105,862

RED AZO-DYESTUFFS AND A PROCESS FOR THEIR MANUFACTURE

Oskar Knecht and Theodor Wirth, Basel, Switzerland, assignors to the firm of Chemical Works, formerly Sandoz, Basel, Switzerland No Drawing. Application November 9, 1935, Serial No. 49,110. In Switzerland November 21, 1934

2 Claims. (Cl. 260—92)

The present invention relates to new red monoazo-dyestuffs.

It has been found, that by coupling diazotized 1-aminobenzene-2-sulphamides of the general formula

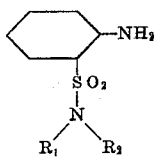

wherein $R_1$ stands for a benzene nucleus and $R_2$ represents a radical free from hydroxy groups, selected from the class consisting of alkyl aralkyl and aryl, with 2-amino-8-hydroxynaphthalene-6-sulphonic acid in an acid medium, red monoazo-dyestuffs of excellent fastness properties will be obtained.

As sulphamide useful in the present process the following can be cited: 1-aminobenzene-2-sulphonylethylanilide, 1-aminobenzene-2-sulphonyl-diphenyl-amide, 1-aminobenzene-2-sulphonylbenzyl-m-toluidide, 1-aminobenzene-2-sulphonylethyl-2'-methoxy-5'-chloroanilide, etc.

The object of the present invention are, therefore, the red monoazo-dyestuffs of the general formula:

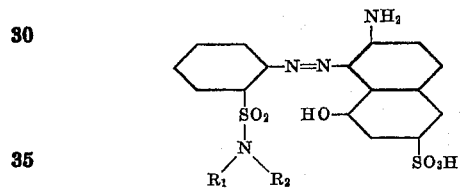

wherein $R_1$ stands for a benzene nucleus and $R_2$ represents a radical free from hydroxy groups, selected from the class consisting of alkyl, aralkyl and aryl, which are in the dry state red to brown-red powders, soluble in water with a red coloration and dyeing animal fibres red shades of excellent fastness properties.

The following examples, without being limitative, illustrate the present invention.

Example 1

27.6 parts of 1-aminobenzene-2-sulphonylethyl-anilide are diazotized with 6.9 parts of sodium nitrite and 25 parts of hydrochloric acid of 30 per cent strength and the clear yellow diazo solution is added to an acetic acid solution of 24 parts of 2-amino-8-hydroxynaphthalene-6-sulphonic acid; the excess of mineral acid is then neutralized by an addition of sodium acetate and the dyestuffs salted out with common salt, filtered and washed with a common salt solution. It constitutes, after drying, a brown-red powder, very easily soluble in water.

The dyestuff dyes wool a clear red shade; the dyeing is very level and possesses a good fastness to light.

Example 2

32 parts of 1-aminobenzene-2-sulphonyldiphenylamide are diazotized in an acetic acid solution with 6.9 parts of sodium nitrite and 25 parts of hydrochloric acid of 30 per cent strength, diluted with water, and the whole is allowed to run into an acetic acid solution of 24 parts of 2-amino-8-hydroxynaphthalene-6-sulphonic acid. After neutralization of the excess of mineral acid by means of an addition of sodium acetate, the precipitated dyestuff is filtered, washed with a common salt solution and dried. It constitutes a brown-red powder, which is easily soluble in water and dyes wool a clear bluish-red tone. The dyeing is exceedingly level and shows a very good fastness to light and fulling.

Example 3

34 parts of 1-aminobenzene-2-sulphonylethyl-2'-methoxy-5'-chloroanilide are diazotized with 6.9 parts of sodium nitrite and 25 parts of hydrochloric acid of 30 per cent strength. The coupling with 24 parts of 2-amino-8-hydroxynaphthalene-6-sulphonic acid and the isolation of the dyestuff are carried out as described in Example 2.

The dyestuff thus obtained constitutes a brown-red powder, which is easily soluble in water. The dyeings are very level and possess a good fastness to light and fulling.

Example 4

35.2 parts of 1-aminobenzene-2-sulphonylbenzyl-m-toluidide are diazotized in an acetic acid solution with 6.9 parts of sodium nitrite and 25 parts of hydrochloric acid of 30 per cent strength and copulated with 24 parts of 2-amino-8-hydroxynaphthalene-6-sulphonic acid in the manner described in Example 2.

The dyestuff thus obtained is a red powder, easily soluble in water, dyeing wool a clear bluish-red shade. The dyeing is extraordinarily level and possesses a good fastness to light and fulling.

What we claim is:—

1. Red monoazo-dyestuffs of the general formula:

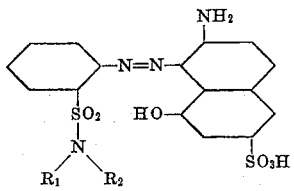

wherein $R_1$ stands for a benzene nucleus and $R_2$ represents an unsubstituted alkyl group, said dyestuffs being in the dry state red to brown-red powders, soluble in water with a red coloration and dyeing animal fibres red shades of excellent fastness properties.

2. The red monoazo-dyestuff of the formula:

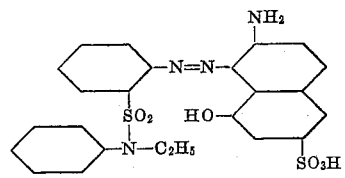

which is in the dry state a brown-red powder, easily soluble in water with a red coloration and which dyes animal fibres fast red shades.

OSKAR KNECHT.
THEODOR WIRTH.